(12) United States Patent
Spitzer et al.

(10) Patent No.: US 8,000,517 B2
(45) Date of Patent: Aug. 16, 2011

(54) TEST PROCEDURE FOR MEASURING THE GEOMETRIC FEATURES OF A GOLF CLUB FACE

(75) Inventors: John Spitzer, Morrisville, PA (US); Matthew Pringle, Bordentown, NJ (US); James Hubbell, Basking Ridge, NJ (US)

(73) Assignee: United States Golf Association, Far Hills, NJ (US)

( * ) Notice: Subject to any disclaimer, the term of this patent is extended or adjusted under 35 U.S.C. 154(b) by 225 days.

(21) Appl. No.: 12/454,317

(22) Filed: May 15, 2009

(65) Prior Publication Data
US 2010/0212172 A1 Aug. 26, 2010

Related U.S. Application Data

(63) Continuation-in-part of application No. 12/380,132, filed on Feb. 24, 2009.

(51) Int. Cl.
*G06K 9/00* (2006.01)
*B29C 45/76* (2006.01)
*A63B 53/04* (2006.01)

(52) U.S. Cl. ........ 382/141; 264/40.1; 264/225; 473/330

(58) Field of Classification Search .................... 33/508; 264/40.1, 225; 382/100, 141; 473/324, 330, 473/331, 342, 345, 349
See application file for complete search history.

(56) References Cited

U.S. PATENT DOCUMENTS

| | | | | |
|---|---|---|---|---|
| 4,993,475 A * | 2/1991 | Yamada | ........................ | 164/340 |
| 5,377,986 A * | 1/1995 | Viollaz et al. | .................. | 473/330 |
| 5,596,812 A * | 1/1997 | Solheim | .......................... | 33/508 |
| 5,778,966 A * | 7/1998 | Hsieh | ............................. | 164/332 |
| 7,041,005 B2 * | 5/2006 | Beach et al. | .................. | 473/345 |
| 2010/0212171 A1 * | 8/2010 | Spitzer et al. | .................. | 33/508 |
| 2010/0215275 A1 * | 8/2010 | Spitzer et al. | ................. | 382/195 |

* cited by examiner

*Primary Examiner* — Amy Cohen Johnson
(74) *Attorney, Agent, or Firm* — Francis C. Hand; Carella, Byrne, Cecchi (57) ABSTRACT

The test procedure for determining groove conformance employs a replicating compound to obtain a self-supporting mass with a negative image of the grooves of a club face. A thin test specimen strip is sliced from the mass and then scanned to form an electronic trace of the profile of the ribs. A negative image of the profile of the ribs is then obtained as a replica of the profile of the grooves and the grooves measured to determine conformance to USGA Rules. A protective covering may be placed on the self-supporting mass to insure the integrity of the ribs during slicing.

28 Claims, 5 Drawing Sheets

TEST PROCEDURE FOR MEASURING THE GEOMETRIC FEATURES OF A GOLF CLUB FACE

This is a Continuation-in-Part of copending Ser. No. 12/380,132 filed Feb. 24, 2009.

This invention relates to a test procedure for measuring the geometric features of the face of a golf club. More particularly, this invention relates to a test procedure for measuring the geometric features of the face of a golf club to determine conformance with United States Golf Association standards. Still more particularly, this invention relates to a test procedure to determine groove conformance with United States Golf Association standards.

As is known the United States Golf Association (USGA) has promulgated Rules of Golf that include Rules regarding the design of clubs and, particularly, at Appendix II, 5 the design of a club face. These Rules require a club face to be smooth and without any degree of concavity; with a surface roughness that does not exceed that of decorative sandblasting or fine milling; and, if the face has grooves and/or punch marks, that the grooves and/or punch marks conform with certain specified standards.

The United States Golf Association has also published procedures to follow to determine groove conformance effective Jan. 1, 2010.

Accordingly, it is an object of this invention to provide a simple test procedure to determine golf club face conformance with USGA standards.

It is another object of the invention to provide a technique that may be employed on a golf course for determining conformance of a golf club face with USGA standards.

It is another object of the invention to provide a technique that can determine conformance of a golf club face with USGA standards in a rapid manner.

Briefly, the invention provides a test procedure for determining conformance of a golf club face with USGA standards that may be carried out on a golf course or in a test lab or, in part on a golf course and, in part, in a test lab.

The test procedure starts with a clean face of a golf club and as a first step, requires the application of a casting compound to the face of the golf club head to obtain a self-supporting casting (replica) with a negative image of the club face. A thin test specimen strip is then sliced from the casting and scanned to form an electronic trace of the profile of the test strip. A negative image of the profile is then obtained as a replica of the profile of the club face and is measured to determine conformance to USGA Rules.

The casting compound may be self-curing or may be a mixture of two compounds. A suitable casting compound is a replicating two-part compound sold by Microset Products Ltd. of Nuneaton, Warwickshire, U.K. under the designations of Microset 121F part A and Microset 121F part B. This two part rubber compound that may have a consistency similar to a modeling clay and that may be mixed in the hands and applied to the area of interest on the club face (usually the center).

Alternatively, a dam may be positioned on the club face and a two part liquid rubber resin flowed over the face of the club while being contained by the dam. This liquid rubber resin may have the consistency of molasses.

In both cases, the cured compound should have a thickness of approximately 0.125" and should be maintained on the face of the club for a time sufficient for the compound to cure into a self-supporting casting forming a negative impression of the club face. Such time should be as recommended by the manufacturer of the compound. Where the club face has grooves that are to be measured, the time for curing of the casting should be sufficient for the casting, once cured, to have a plurality of ribs on one side forming a negative impression of the grooves of the grooved face.

After curing, the self-supporting casting is removed from the face of the golf club head. For example, when applied manually by pressing the compound onto the club face, the compound may be applied to cure into a disc-like shape or any other suitable shape. When applied using a dam, the compound is shaped into the shape imparted by the dam. In this latter case, the dam may be profiled to form a rectangular shape with a pair of oppositely disposed recesses parallel to any grooves in the club face. In this latter case, when the casting compound flows into the recesses, a pair of outwardly extending keys is formed in the resulting casting.

Next, in order to obtain a test specimen, the self-supporting casting is placed in a slicing apparatus with the replica of the club face facing up. The slicing apparatus may include one or more knives, a saw, or any other suitable slicing mechanism, for slicing one or more thin test specimens from the casting. For example, a pair of knives may be positioned in parallel within the slicing apparatus so as to slice a thin strip, i.e. the test specimen, from the self-supporting casting. For example, the sliced strip should have a finite thickness of from 0.001" to 1", preferably from 0.050" to 0.250" and, most preferably, 0.0625".

In cases where the club face is grooved, the casting is oriented such that the ribs that form a negative impression of the grooves are perpendicular to the slicing mechanism of the slicing apparatus.

Thereafter, each test strip (test specimen) is scanned, for example, on a flatbed scanner to form an electronic image of the profile the strip in any electronic format but preferably a lossless format, such as a grayscale bitmap.

Next, a negative image of the profile is obtained from the electronic image as a replica of the profile of the club face. This step may be performed by converting the electronic image from grayscale to a black and white image by setting all pixels with intensity level less than or equal to the threshold level to 0 (black) and pixels with intensity levels greater than the threshold to 1 (white). The threshold may be in the range or 0 to 1, preferably 0.25 to 0.75 and most preferably 0.55. The profile of the club surface replica is the boundary between the black and white regions of the image.

The negative image is then measured, or otherwise analyzed, to determine conformance with a predetermined standard. For example, the predetermined standard may be at least one of groove width, depth, area and spacing from an adjacent groove; smoothness; degree of concavity; surface roughness; and punch mark area, depth, spacing from an adjacent groove or punch mark, sharpness of edge and raised lips, according to United States Golf Association (USGA), Rules of Golf. In the case of groove measurements, use may be made of the procedures set forth in the USGA, *Determination of Groove Conformance*, Revision 1-09, January, 2009.

Where multiple test strips are obtained from one casting, it is possible to measure different areas on the face of a golf club and make comparisons for consistency.

The test procedure may be performed in the field, i.e. on a golf course during play, at a remote test site, or partly in the field and partly in a lab at a remote site. For example, a golf official having a need to determine the conformance of a club face may apply the casting compound to a golf club while on a golf course. After curing and removing the self-supporting casting, the official may place the self-supporting casting in a slicing apparatus delivered to the official on the golf course or the official may take the casting to a slicing apparatus located in a nearby club house or pro shop. After a test specimen has been obtained, the specimen is scanned in a scanner, for example, a hand-held scanner, digital camera, or other electronic imaging means, or a flat bed scanner or other electronic imaging means located in the club house or pro shop or otherwise. The scanned image is then electronically transmitted to the remote test lab for analysis.

The image of the test specimen may be transmitted to a computer at the test lab for processing thereon with suitable software to determine conformance of the club face with certain predetermined standards, such as those promulgated by the USGA for surface smoothness or roughness, punch marks and grooves. The results of conformance or not may then be transmitted to the official electronically.

Various techniques may be used to maintain the integrity of the test strips and, particularly, the grooves of a test strip during slicing. For example, immediately after removal of the self-supporting casting (replica) from the face of a golf club head, a second compound of a contrasting color to that of the casting is poured over the face and ribs of the casting and allowed to cure to form a protective covering. Thus, the ribs, i.e. the replicas of the grooves of the golf club, are now supported by the protective covering and subsequent slicing of a test strip from the casting does not distort the replicas of the grooves. Further, the protective covering protects the replica from an accumulation of dust and other foreign matter and prevents the imaging of the groove replica from "seeing" anything but the two dimensional face of the groove replica.

In this latter embodiment, the use of the second, contrasting color compound reduces the need to obtain thin test specimens for evaluation. With the second compound applied, the guillotine with a single blade, or even a hand held, sharp knife could be used to bisect the casting, down the centerline, for example, and then the edge of either of the two resulting pieces could be scanned or otherwise imaged and measurements could be made. Furthermore, the casting could be sliced at multiple locations to provide a plurality of cross sections, all of which can be imaged and analyzed for the purpose, for example, of determining variation in the dimensions or the fidelity of the measurements.

These and other objects and advantages of the invention will become more apparent from the following detailed description taken in conjunction with the accompanying drawings wherein:

In accordance with The Rules of Golf, 2008-2009, there are certain standards that have been promulgated by the United States Golf Association for golf clubs. In particular, Appendix II that relates to the design of clubs provides under Section 5 certain specifications for a club face, including smoothness, lack of any degree of concavity, roughness, grooves and punch marks, decorative markings and markings on non-metallic club faces and putter faces. In particular, Section 5C (impact area markings) provides certain standards for a club having grooves in the impact area of the club face.

From time to time, a need arises to determine if a club face conforms to The Rules of Golf. The following provides a test procedure for determining the conformance of a golf club face.

As a first step in the test procedure, the club face 10 of a golf club, such as an iron, is cleaned particularly to remove any paint that may have been applied to the grooves 11 in the face 10. Cleaning may be carried out using any suitable fluid, water, an alcohol swipe, solvent, compressed gas or a mechanical action.

Figure 1:
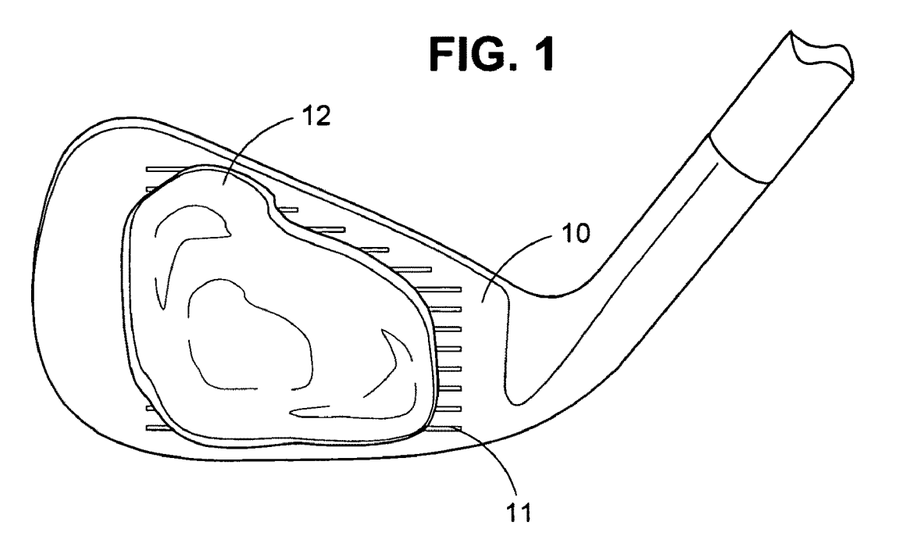
FIG. 1 illustrates a perspective view of a golf club face with grooves and a casting compound thereon in accordance with the invention.

Referring to FIG. 1, after the club face 10 has been cleaned, a curable casting or replicating compound is applied to the grooved face 10. For example, the compound may be a two part rubber compound that may be mixed in the hands and applied to the area of interest on the club face 10, usually the center of the club face 10. Typically, the hands are used to squeeze the compound into the grooves 11 in the club face 10.

By way of example, one part of the compound may be a Microset 121F part A while the other part is a Microset 121F part B, each supplied from Microset Products Ltd. of Nuneaton, Warwickshire, U.K. Any other suitable casting or replicating compound may also be used. As is known, replicating compounds cure quickly to produce flexible high resolution replicas which can be peeled from a surface.

The moldable compound is applied to the club face 10 to form any suitable shape to encompass most of, if not all, of the grooves 11 in the club face 10. For example, the compound may be of any suitable shape, such as circular, oval or rectangular.

Figure 2:
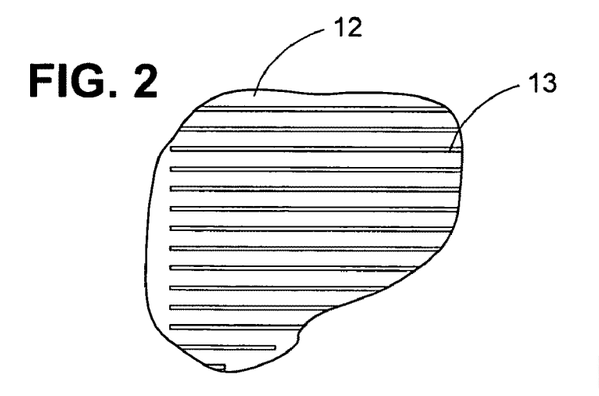
FIG. 2 illustrates a plan view of the underside of the cured compound (casting) after removal from the golf club face of FIG. 1.

After curing, the compound is peeled from the golf club as self-supporting casting 12. As indicated in FIG. 2, this casting 12 has a plurality of ribs 13 on the underside that are a replica of the grooves 11 of the golf club face 10.

Figure 8:
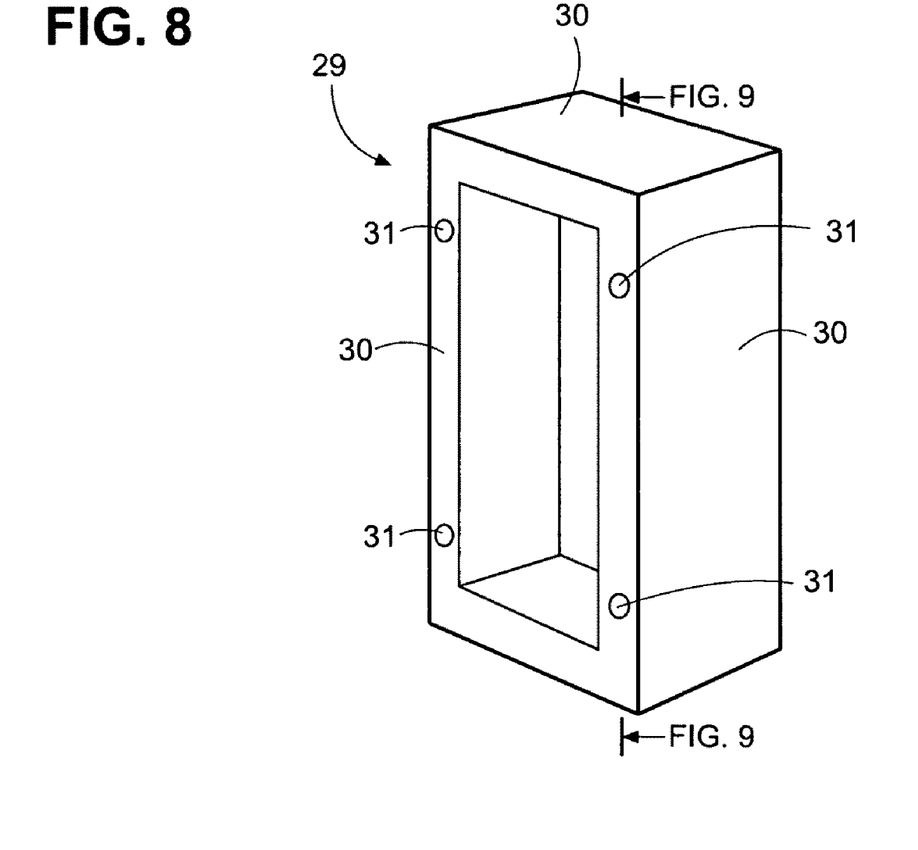
FIG. 8 illustrates a perspective view of a dam in accordance with the invention.
Figure 9:
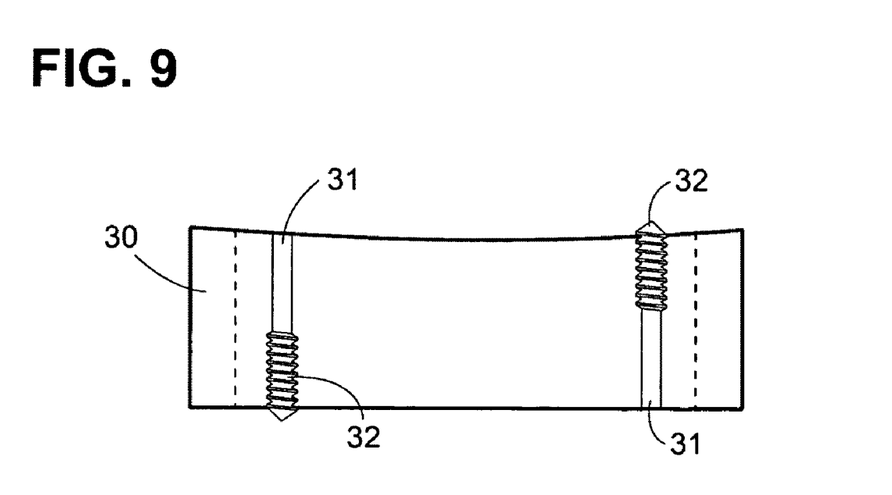
FIG. 9 illustrates a longitudinal cross-section of the dam of FIG. 7.

Referring to FIGS. 8 and 9, a dam 29 may be used where the moldable compound is of a pourable type. In this case, the dam 29 is in the form of retaining reservoir shaped to contain a two part polymer semi-viscous liquid replicating compound while in the curing stage (typically 5-8 minutes). The reservoir 29 is sized to contain the replicating compound over an area of interest on a surface being analyzed. As viewed, the reservoir 29 is of a rectangular block-like shape with four walls 30 defining a rectangular opening.

In the case of a golf club face 10, the two longer walls 30 of the reservoir 29 are provided with threaded bores 31 that each receives a pair of threaded alignment pins 32. As indicated in FIG. 9, the pins 32 are of less length than the bores 31 so that each pin 32 may be accessed, for example by a screw driver, for threading outwardly of the reservoir 29 and into a groove 11 of a club face 10. Each pin 32 is of a diameter to fit into a groove 11 of a club face 10 for alignment purposes. By projecting the two pins 32 in a longitudinal wall 30 outwardly into the same groove 11 of a club face, the reservoir 29 can be aligned in parallel to the grooves 11.

Additional features such as notches or tabs may also be removed or added to the interior walls of the reservoir 29 to act as reference marks on the cured replicating compound. These reference marks will allow the replicating compound's orientation to be identified once a casting 12 has been removed from the reservoir 29. To accommodate contoured surfaces, the contact surfaces of the reservoir walls 30 may have an overall radius to prevent the semi-viscous liquid replicating compound from leaking from the reservoir 29 during the curing process. In the case of golf club faces, a 10 inch radius is the preferred dimension that will accommodate the majority of golf clubs with bulge and roll.

The rectangular shape of the reservoir 29 is the preferred shape, but other easily manufactured shapes can be utilized to accommodate other test surface geometries.

The dam 29 may also include magnets or straps (not shown) to aid in temporarily fixing the dam 29 to a club head.

Figure 3:
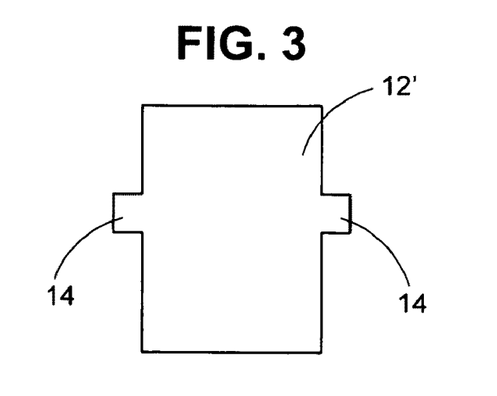
FIG. 3 illustrates a modified shape of the cured compound after removal from the golf club face of FIG. 1.

During the casting step of the process, the poured resin takes on the shape of the dam 29 thereby forming a rectangular self-supporting casting 12', as indicated in FIG. 3, with a pair of outwardly directed keys 14 corresponding to and parallel to a groove 11 in the club face 10. As indicated, the keys 14 are co-linear with each other.

Also, the dam 29 could be made in whole or in part with conformal materials that allow the dam to better mate with the club face. The shape of the perimeter of the dam 29 could itself serve as a register in the slicing apparatus and thus eliminate the need for distinct keys 14.

The use of the dam 29 is not necessarily limited to use with a flowing type casting compound and the use of a flowing type casting compound is not limited to use with the dam 29. For example, use has been made of thick putty with a dam and a thin flowing liquid without a dam to obtain a casting.

Figure 4:
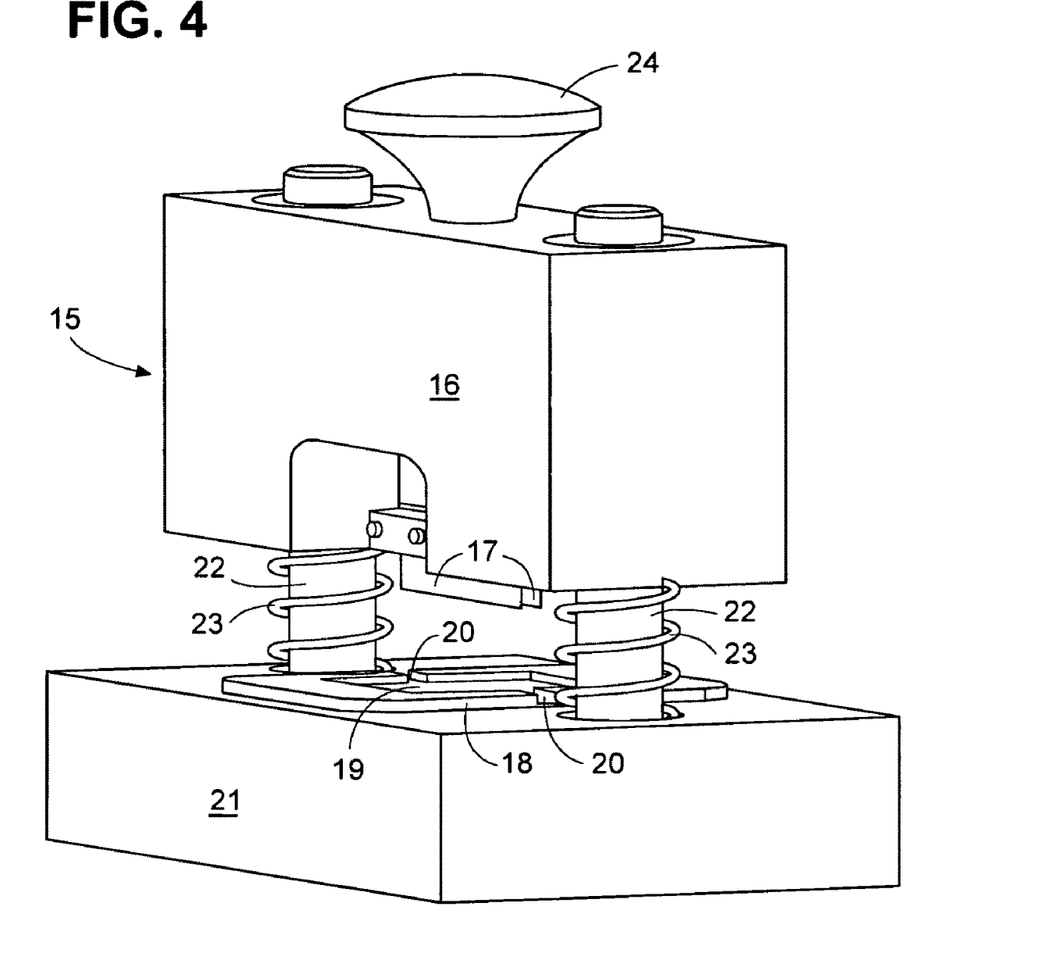
FIG. 4 illustrates a perspective view of a slicing apparatus for slicing a test specimen strip from the cured compound of FIG. 3.

Referring to FIG. 4, a slicing apparatus 15 is provided for obtaining a test specimen from the cured compound (self-supporting casting) 12. This slicing apparatus 15 has a guillotine assembly 16 that includes a pair of cutting knives 17 that are disposed in parallel spaced apart relation for cutting a thin strip as a test specimen from the cured compound. The knives 17 must be of extreme sharpness to achieve good cutting.

When the self-supporting casting 12 is placed in the slicing apparatus 15, the ribs 13 are disposed in perpendicular relation to the cutting knives 17.

In the illustrated embodiment, the slicing apparatus 15 is provided with a bed plate 18 having a recess 19 that is shaped to the shape of the self-supporting casting 12' of FIG. 3. That is, the recess 19 is of rectangular shape with a pair of slots 20 disposed in co-linear relation to each other and at opposite sides of the recess so as to receive the self-supporting casting 12' and keys 14 in mating relation. This insures that the ribs 13 of the casting 12' are perpendicular to the cutting knives 17. The bed plate 18 is preferably made of a material that is stiff yet not damaging to the knives.

In addition, the slicing apparatus 15 has a mounting block 21 on which the bed plate 18 is supported and a pair of vertical posts 22 that extend in parallel relation upwardly from the mounting block 21 to either side of the bed plate 18 and that slidably mount the guillotine assembly 16 thereon. A spring 23 is coiled about each respective post 22 in order to resiliently support the guillotine assembly 16 in an elevated position above the mounting block 21 and bed plate 18.

The guillotine assembly 16 has a recessed area within which the cutting knives 17 are mounted in a suitable fixed manner. As illustrated, the knives 17 depend from the guillotine assembly 16 and are secured in place to move therewith.

A handle 24 is mounted on top of the guillotine assembly 16 for manual grasping by a user.

Pushing down on the guillotine assembly 16 against the force of the springs 23 causes the guillotine assembly 16 to move downwardly and the cutting knives 17 to pass into the recess 19 of the bed plate 18. The two cutting knives 17 are of a length to move into the slots 20 in the recess 19 to slice a thin test specimen 25 (See FIG. 5) from the cured compound and are spaced apart to form a sliced strip having a finite thickness of from 0.001 inch to 1 inch and preferably 0.0625 inch.

Upon lifting of the guillotine assembly 16 from the mounting block 21, the test specimen strip 25 may be removed from between the two cutting knives 17 for the next step in the process. To this end, the slicing apparatus 15 may be equipped with an ejector mechanism for removing the strip 25 from between the two knife blades 17.

Figure 5:
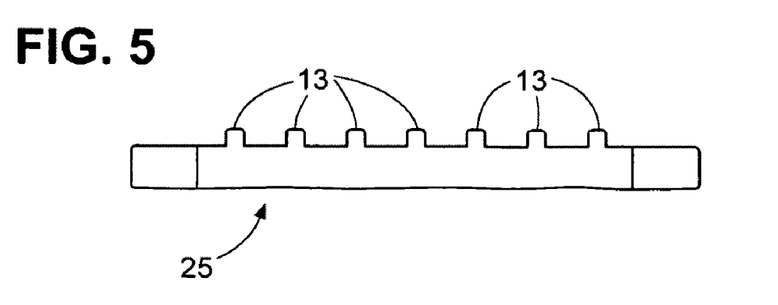
FIG. 5 illustrates a side view of the test specimen sliced from the cured compound.

The test specimen strip 25 has a profile corresponding to a cross-section of the casting 12 and allows the strip 25 to be evaluated to determine conformance with a predetermined standard as described below.

When a dam is not used, the slicing apparatus 15 may be equipped with alignment aids, such as indicators or lasers, and the like, for an operator to use to align the ribs 13 on the test specimen 25 with the slicer.

Figure 6:
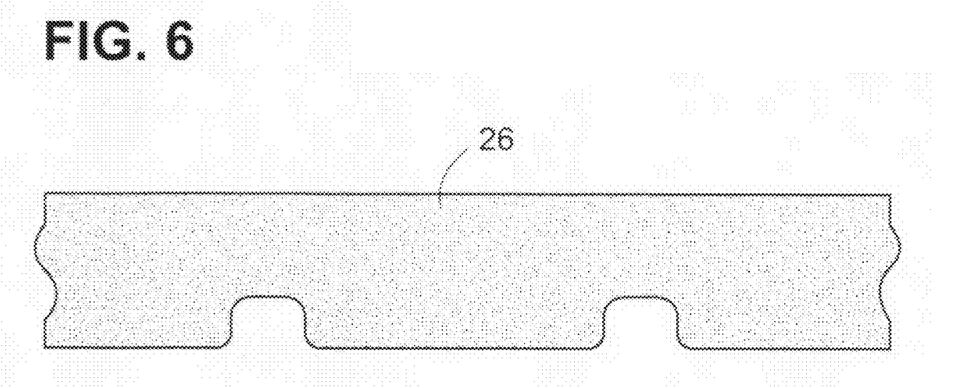
FIG. 6 illustrates a black and white image of a gray scaled scanned image of a test specimen strip in accordance with the invention.

Thereafter, the test strip 25 is scanned, for example, on a flat bed scanner (not shown) to form an electronic image of the profile of the ribs 13 on the strip 25 in any suitable electronic format, and preferably a lossless format, such as a gray scale bitmap 26. (See FIG. 6)

Figure 7:
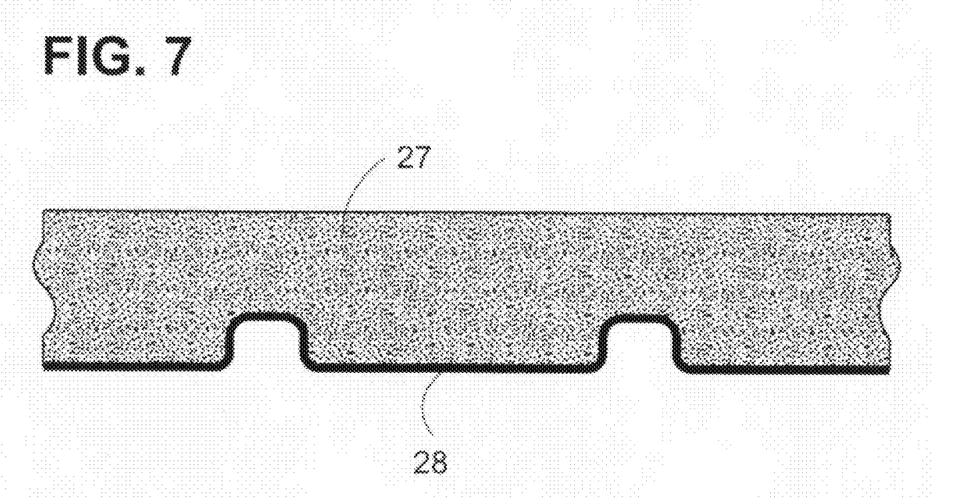
FIG. 7 illustrates a black and white image that has been converted from the gray scale image of FIG. 6.

The scanned image is then transmitted to a computer at a central location, preferably a test lab, or to an onsite computer. As received, the scanned image is converted from gray scale bitmap 26 (see FIG. 6) to black and white image 27 (see FIG. 7) by setting all the pixels with an intensity level less than or equal to a threshold level to 0 (black) and pixels with intensity levels greater than the threshold to 1 (white). The threshold may be in the range of 0 to 1, preferably 0.25 to 0.75 and most preferably 0.55. The result is a negative image of the profile of the ribs of the specimen and is a replica of the profile of the grooves 11 of the grooved club face 10 (see FIG. 7). The profile of the grooved replica is the boundary 28 of the black and while regions of the image.

In addition to arbitrarily setting the threshold, it is possible (and may be even preferable) to employ an automated threshold algorithm to determine the optimum pixel intensity to convert a gray scale image to black and white. For example, Otsu's method may be employed which chooses the threshold to minimize the intraclass variance of the thresholded black and white pixels.

Alternatively, a color image of the test strip 25 may be captured. In this case, individual red, green and blue intensity values may be used independently or combined via a linear transformation to convert to a black and white image. That is, the red, green or blue image intensities may be used and scaled from 0 to 1. Alternatively, the red, green and blue intensities may be combined via a linear transformation to give a single intensity level at each pixel. An example might be to average all three intensities and scale from 0 to 1. Another example would be to combine the three colors by taking 30% of the red value, 59% of the green value and 11% of the blue value and scaling from 0 to 1. The intensity image is then converted to a binary, black and white image by converting all intensities less than or equal to a threshold to 0 (black) and all intensities greater than the same threshold to 1 (white). The profile of the face geometry is then defined as the boundary between the black and white regions.

The profile of the negative image is then measured by suitable software within the computer to determine conformance of the grooves with the standards provided by the USGA, *Determination of Groove Conformance*, Revision 1-09, January, 2009.

The measurements and analyses are taken to determine, for example, groove width, groove depth, groove separation, groove consistence, area (A) over width (W) plus separation (S), i.e. A/(W+S), and edge radius.

The test procedure may be carried out completely in a test lab, particularly where several golf clubs are to be tested for groove conformance. Likewise, the entire test procedure may be carried out at a golf course site provided the equipment for performing the test is available, such as, the slicing apparatus, a scanner and a computer having the software required for performing an analysis.

The test procedure is relatively simple and may be performed within a minimum of time should a need arise for testing a golf club during a golf tournament.

Figure 10:
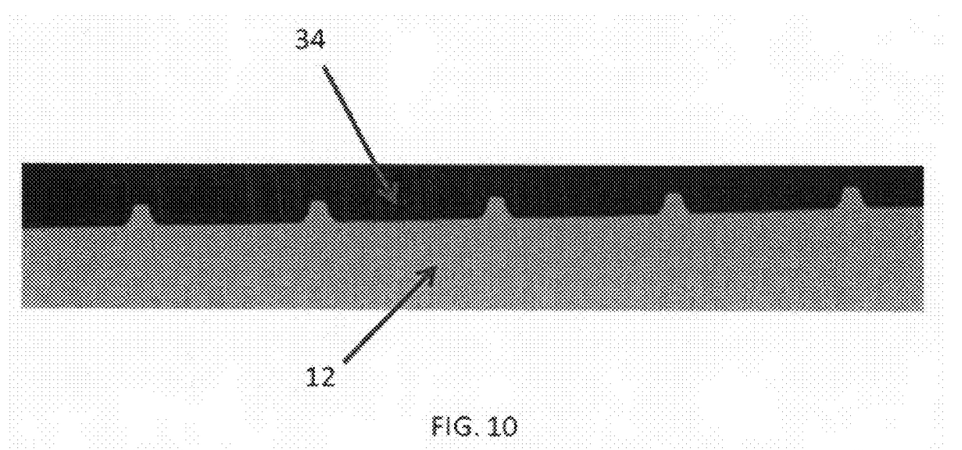
FIG. 10 illustrates an electronic image of the cross-section of a test specimen strip with a protective covering in accordance with the invention.

Referring to FIG. 10, wherein like reference characters indicate like parts as above, in order to maintain the integrity of the face and ribs 13 of the casting 12, a second compound 33 similar to the compound used to make the casting 12, but of a contrasting color, e.g. black, is poured over the face and ribs 13 immediately after removal of the self-supporting casting (replica)12 from the face 10 of the golf club head and allowed to cure to form a protective covering 34. Thus, the ribs 13, i.e. the replicas of the grooves 11 of the golf club face 10, are now supported by the protective covering 34 and subsequent slicing of a test strip from the casting does not distort the grooves. The covering 34 is of a thickness that is sufficient to cover the tops of the ribs 13, for example between 0.020 inch and 0.125 inch and preferably 1/16 inch.

The compound for the covering 34 is applied after the compound for the casting 12 has set and then needs to set as per the manufacturer's instructions, preferably 10 seconds to 10 minutes and, most preferably, 2 to 5 minutes. The compound for the covering 34 should be of a suitable viscosity to promote flowing over the casting 12 while not being so liquid as to flow off and not cover the ribs 13.

The protective covering 34 protects the groove replica from an accumulation of dust and other foreign matter and prevents the imaging of the groove replica from "seeing" anything but the two dimensional face of the groove replica.

The casting 12 with the protective covering 34 may be processed in the slicing apparatus 15 in the same manner as the casting 12 described above without the covering 34 to obtain one or more test specimen strips having a cross-section as illustrated in FIG. 10. During slicing, the protective covering 34 maintains the integrity of the ribs 13.

Also, the casting 12 with the protective covering 34 may be processed in the slicing apparatus 15 with the guillotine assembly 16 having a single blade to bisect the casting 12 down the centerline, for example, and then the edge of either of the two resulting pieces could be scanned or otherwise imaged and measurements could be made. The guillotine assembly 16 with a single blade may also be used to make multiple cuts through the casting 12 to obtain multiple pieces that can be scanned or otherwise imaged and measurements made.

As in the first embodiment, cutting the casting and the protective covering thereon along at least one cutting line obtains at least one test piece having a profile corresponding to a cross-section of the casting and the protective covering for evaluation to determine conformance with a predetermined standard.

Thereafter, as described above, the test strip is scanned to obtain an electronic image of the ribs 13 that is, in turn, transmitted to a computer for conversion into a negative image of the profile of the ribs 13.

Alternatively, the cross-section of the test specimen strip, for example, as shown in FIG. 10 may be used directly to obtain a measurement of the replicated grooves. In this respect, the protective covering 34 contains a replica of the grooves of the golf club face that may be directly measured, for example, manually or electronically. However, it is believed that this measurement technique would not produce measurement results that are as accurate as the above described procedure.

The materials used to perform the test procedure, such as the curable casting compounds, are simple to use.

Further, it may be possible to use a casting compound and dam configuration that gives an accurate cross-section of the face of a golf club without the need to cut. Also, it may be envisioned that certain compounds once cast, may be imaged from the side without the need to slice the casting and thus an image is made of the negative of the face profile.

While a detailed description has been provided of one embodiment of the invention for determining groove conformance of a golf club, the test procedure may be used to determine the conformance of a club face to other standards, such as for smoothness; degree of concavity; surface roughness; and punch mark area, depth, spacing from an adjacent groove or punch mark, sharpness of edge and raised lips; decorative face markings; and micro features, such as milling marks. Further, obtaining multiple slices from one casting permits the measurement of different areas on the club face and allows comparisons for consistency of surface or grooves to be made.

Roughness may be calculated using the test procedure of casting/slicing/scanning according to the most recent ASTM B46.1 standard. The degree of concavity and the punch marks may be evaluated manually using the profile obtained by the casting/slicing/scanning test procedure.

What is claimed is:

1. A test procedure to measure the geometric features of a face of a golf club comprising the steps of
    applying a casting compound to a face of a golf club head;
    maintaining the casting compound on said face for a time sufficient for the compound to cure into a self-supporting casting having a negative impression of said face;
    removing the casting from the said face of the golf club head;
    removing at least one test strip from the casting;
    scanning said strip to form an electronic two-dimensional image of the profile of said strip;
    obtaining a negative image of said profile from said electronic image as a replica of the surface of said club face corresponding to the location of said test strip; and
    measuring the negative image to determine conformance with a predetermined standard.

2. A test procedure as set forth in claim 1 wherein said predetermined standard is at least one of groove width, depth, area and spacing from an adjacent groove; smoothness; degree of concavity; surface roughness; and
    punch mark area, depth, spacing from an adjacent groove or punch mark, sharpness of edge and raised lips.

3. A test procedure as set forth in claim 1 wherein the casting compound is applied manually to said face of the golf club head.

4. A test procedure as set forth in claim 1 wherein the casting compound is a two-part manually kneadable compound.

5. A test procedure as set forth in claim 1 wherein the casting compound is a two-part liquid rubber resin.

6. A test procedure as set forth in claim 5 further comprising the steps of forming a dam on said face and pouring the two-part liquid rubber resin onto said face within the dam to form the self-supporting casting upon curing thereof.

7. A test procedure as set forth in claim 5 wherein the dam has a profile shape defining a pair of oppositely disposed slots for forming a self-supporting casting having a pair of oppositely disposed keys parallel to the grooves of the club face and the ribs formed thereon.

8. A test procedure as set forth in claim 1 wherein the strip removed from the self-supporting casting has a width of from 0.050 inches to 0.250 inches.

9. A test procedure as set forth in claim 1 wherein the step of measuring the negative image is conducted electronically.

10. A test procedure as set forth in claim 1 wherein the electronic image of the profile of the test strip is transmitted to a remote location and said steps of obtaining a negative image and measuring the negative image take place at said remote location.

11. A test procedure as set forth in claim 1 wherein the electronic image of the profile of the test strip is formed in a grayscale bitmap format and said step of obtaining a negative image includes converting the electronic image from said grayscale format to a black and white image by setting all pixels with an intensity level less than or equal to the threshold level to 0 (black) and pixels with intensity levels greater than the threshold to 1 (white) whereby the boundary between the black and white regions of the black and white image replicate the profile of the club face.

12. A test procedure as set forth in claim 11 wherein the step of measuring the black and white image is conducted electronically.

13. A test procedure as set forth in claim 11 wherein the electronic image of the profile of the strip is transmitted to a remote location and said steps of obtaining a black and white image and measuring the black and white image take place at said remote location.

14. A test procedure as set forth in claim 1 wherein the step of removing a test strip includes placing the self-supporting casting removed from the golf club head on a bed plate and slicing a pair of parallel spaced apart knives through the casting to remove the test strip therefrom.

15. A test procedure to measure the grooves in a face of a golf club comprising the steps of
applying a casting compound to a grooved face of a golf club head;
maintaining the casting compound on said face for a time sufficient for the compound to cure into a self-supporting casting having a plurality of ribs thereon, forming a negative impression of the grooves of the grooved face;
removing the self-supporting casting from the grooved face of the golf club head;
removing at least one test strip from the self-supporting casting disposed perpendicularly of the ribs thereon;
scanning said test strip to form an electronic image of the profile of the ribs on said strip;
obtaining a negative image of said profile of the ribs from said electronic image as a replica of the profile of the grooves of the grooved club face; and
measuring the grooves of the negative image to determine conformance with a predetermined standard of at least one of groove width, depth, area and spacing from an adjacent groove.

16. A test procedure as set forth in claim 15 wherein a plurality of test strips are removed from said casting and wherein each said test strip is scanned to form an electronic two-dimensional image of the profile of each said strip and a negative image of said profile of each said test strip is obtained as a replica of the surface of said club face corresponding to the location of each said test strip and each said negative image is measured to determine conformance with a predetermined standard.

17. A test procedure to measure the surface of a face of a golf club comprising the steps of
applying a casting compound to a face of a golf club head;
maintaining the casting compound on said face for a time sufficient for the compound to cure into a self-supporting casting to form a negative impression of said face;
removing the self-supporting casting from said face of the golf club head;
removing at least one test strip from the self-supporting casting;
scanning said test strip to form an electronic image of the profile of said strip;
obtaining a negative image of said profile from said electronic image as a replica of the profile of said club face; and
measuring the negative image to determine conformance with a predetermined standard.

18. A test procedure as set forth in claim 17 wherein said predetermined standard is at least one of groove width, depth, area and spacing from an adjacent groove; smoothness; degree of concavity; surface roughness; and
punch mark area, depth, spacing from an adjacent groove or punch mark, sharpness of edge and raised lips.

19. A test procedure as set forth in claim 17 wherein a plurality of test strips are removed from said casting and wherein each said test strip is scanned to form an electronic two-dimensional image of the profile of each said strip and a negative image of said profile of each said test strip is obtained as a replica of the surface of said club face corresponding to the location of each said test strip and each said negative image is measured to determine conformance with said predetermined standard.

20. A test procedure to measure the geometric features of a face of a golf club comprising the steps of
applying a casting compound to a face of a golf club head;
maintaining the casting compound on said face for a time sufficient for the compound to cure into a self-supporting casting having a negative impression of said face;
removing the casting from said face of the golf club head;
scanning said casting to form an electronic two-dimensional image of the profile of said casting;
obtaining a negative image of said profile of said casing from said electronic image; and
measuring the negative image to determine conformance with a predetermined standard.

21. A test procedure as set forth in claim 20 wherein said predetermined standard is at least one of groove width, depth, area and spacing from an adjacent groove; smoothness; degree of concavity; surface roughness; and punch mark area, depth, spacing from an adjacent groove or punch mark, sharpness of edge and raised lips.

22. A test procedure to measure the geometric features of a face of a golf club comprising the steps of
applying a first casting compound to a face of a golf club head;
maintaining the casting compound on said face for a time sufficient for the compound to cure into a self-supporting casting having a negative impression of said face;
removing the casting from said face of the golf club head;

pouring a second casting compound of a contrasting color to that of the first casting compound over the face of the casting and allowing the second casting compound to cure into a protective covering on the face of the casting;

removing at least one test strip from the casting having the protective covering thereon;

scanning said strip to form an electronic two-dimensional image of the profile of said strip;

obtaining a negative image of said profile from said electronic image as a replica of the surface of said club face corresponding to the location of said test strip; and measuring the negative image to determine conformance with a predetermined standard.

23. A test procedure to measure the grooves in a face of a golf club comprising the steps of applying a first casting compound to a grooved face of a golf club head;

maintaining the casting compound on said face for a time sufficient for the compound to cure into a self-supporting casting having a plurality of ribs thereon forming a negative impression of the grooves of the grooved face;

removing the casting from the said face of the golf club head;

pouring a second casting compound of a contrasting color to that of the first casting compound over the face and the ribs thereon of the casting;

allowing the second casting compound to cure into a protective covering on the face and ribs of the casting while forming grooves in the covering as a negative image of the ribs on the casting;

removing at least one test strip from the casting having the protective covering thereon; and measuring the grooves in the covering to determine conformance with a predetermined standard.

24. A test procedure as set forth in claim 23 wherein said step of measuring is performed manually.

25. In a test procedure to measure the geometric features of a face of a golf club, the steps of applying a first casting compound to a face of a golf club head;

maintaining the casting compound on said face for a time sufficient for the compound to cure into a self-supporting casting having a negative impression of said face thereon;

removing the casting from the said face of the golf club head;

pouring a second casting compound of a contrasting color to that of the first casting compound over the face of the casting having said negative impression thereon;

allowing the second casting compound to cure into a protective covering on the negative impression on the casting while forming a negative image of the negative impression on the casting; and cutting the casting and the protective covering thereon along at least one cutting line to obtain at least one test piece having, a profile corresponding to a cross-section of the casting and the protective covering for evaluation to determine conformance with a predetermined standard.

26. In a test procedure as set forth in claim 25 wherein the face of the golf club has a plurality of parallel grooves and the self-supporting casting has a plurality of ribs forming a negative impression of said grooves, and wherein said step of cutting includes cutting the casting and the protective covering thereon along a pair of parallel cutting lines perpendicular to the ribs to obtain at least one thin test piece having a width of from 0.050 inches to 0.250 inches.

27. In a test procedure as set forth in claim 26 further comprising the steps of scanning said test piece to form an electronic two-dimensional image of the profile of said test piece; obtaining a negative image of said profile from said electronic image as a replica of the grooves of said club face corresponding to the location of said test piece; and measuring the negative image to determine conformance of the replica of the grooves with a predetermined standard.

28. In a test procedure as set forth in claim 25 further comprising the steps of scanning said test piece to form an electronic two-dimensional image of the profile of said test piece; obtaining a negative image of said profile from said electronic image as a replica of the surface of said club face corresponding to the location of said test piece; and measuring the negative image to determine conformance of the replica of the surface of said club face with a predetermined standard.

* * * * *

UNITED STATES PATENT AND TRADEMARK OFFICE
CERTIFICATE OF CORRECTION

| | | |
|---|---|---|
| PATENT NO. | : 8,000,517 B2 | Page 1 of 1 |
| APPLICATION NO. | : 12/454317 | |
| DATED | : August 16, 2011 | |
| INVENTOR(S) | : Spitzer et al. | |

It is certified that error appears in the above-identified patent and that said Letters Patent is hereby corrected as shown below:

Column 9
Line 51, Change "thereon. forming" to -- thereon forming --

Signed and Sealed this
Twenty-seventh Day of September, 2011

David J. Kappos
*Director of the United States Patent and Trademark Office*